United States Patent [19]

McClure et al.

[11] 4,446,928
[45] May 8, 1984

[54] BOOM WITH ENERGY ABSORBING VIBRATION DAMPER

[76] Inventors: Leon C. McClure, R.R. #2, Box 78; Stanley McClure, Sr., R.R. #2, Box 161, both of Jamestown, Ky. 42629

[21] Appl. No.: 349,343

[22] Filed: Feb. 16, 1982

Related U.S. Application Data

[62] Division of Ser. No. 177,166, Aug. 18, 1980, Pat. No. 4,320,595.

[51] Int. Cl.³ .............................................. A01B 73/00
[52] U.S. Cl. .................................... 172/776; 239/167; 239/169
[58] Field of Search ............... 172/311, 456, 776, 126, 172/130; 239/161, 164, 166, 167, 168, 169, 172, 175; 256/39, 40, 41, 42, 43, 44

[56] References Cited

U.S. PATENT DOCUMENTS 614,737 11/1898 Martin ................................... 256/44
2,548,209 4/1951 Foster .................................. 239/167

FOREIGN PATENT DOCUMENTS

2832976 10/1979 Fed. Rep. of Germany ...... 172/126
2332690 6/1977 France ................................. 172/126

Primary Examiner—Richard T. Stouffer
Assistant Examiner—William H. Honaker
Attorney, Agent, or Firm—William R. Price

[57] ABSTRACT

The apparatus includes an endless nylon rope trained over two distally mounted sheaves which define paths spanning either side of the distally mounted sheaves and means for the continuous application of herbicide to the endless rope. The means for applying herbicide to the rope includes an immersion basin in which portions of the rope are continually pulled through a shallow level of herbicide. This is accomplished by training the endless rope onto a drive drum having at least one revolution of rope wherein the bottom of the drum is at a level below the level of the herbicide and an idler drum driven by the driven rope which again has at least one revolution or loop of wetted rope around it and which is submerged in the herbicide within the immersion basin. The distally mounted sheaves are journalled at the end of a boom which extends transversely of a frame work installed onto a tractor and which has height adjustment means allowing the boom and the endless rope trained thereon to be raised or lowered so that the wetted rope wipingly engages the weeds but does not engage the crop. Normally, the weeds grow higher than do the desirable plants, at least in the early stages.

1 Claim, 11 Drawing Figures

BOOM WITH ENERGY ABSORBING VIBRATION DAMPER

This is a division of application Ser. No. 177,166 filed Aug. 18, 1980 now U.S. Pat. No. 4,320,595.

BACKGROUND OF THE INVENTION

This invention relates to a unique apparatus for applying chemicals to plants and specifically for selectively applying herbicide to plants without applying said herbicide to the crops.

Certain non-selective herbicides have been introduced onto the market which are capable of killing virtually any plant with which they come into contact by the application of very small amounts of herbicide to a small area of foliage. Such herbicides are presently being used extensively to kill undesirable vegetation such as Johnson Grass, which heretofore has been virtually uncontrollable. Weeds such as Johnson Grass normally grow to heights far in excess of the desirable crops at least in the early stages.

FIELD OF THE INVENTION

This invention relates to apparatus for selectively applying herbicide or other chemicals to weeds through wiping engagement of the herbicide onto the weed foliage. An object of the invention is to apply the herbicide in such a manner that it is applied only to the weeds normally of a height greater than the crop, selectively as that there is no loss or undesirable spillage of the herbicide onto the crop or onto the soil in which the crops are grown. The invention is especially useful for applying herbicide selectively to weeds such as Johnson Grass which have grown to a height higher than the crop with which it is associated.

DESCRIPTION OF THE PRIOR ART

According to the prior art, various selective herbicides have been employed in which the herbicides are applied directly both to the crop and to the undesirable vegetation. This is, however, economically unsatisfactory in that a much greater amount of herbicide is used than is necessary and involves certain environmental problems by applying the herbicide to the soil surrounding the crop and in applying the herbicide to the crop itself. With the advent of certain very powerful non-selective herbicides, which will kill plants by application of only a small amount of the foliage of weeds, or indeed, to anything else they touch, it has become necessary to devise apparatus which will apply the herbicide only to the weeds and not to the desirable plants. Thus, for example, there have been devised certain recirculating type sprayers such as those disclosed by John O. Moore and Ray H. Dawson in U.S. Pat. No. 4,168,790 and by J. W. Thomason in U.S. Pat. No. 3,584,787. These techniques involve the spraying of the non-selective herbicides to weeds taller than the crop whereby the herbicide is sprayed above the level of the cultivated crop to contact the portions of the weeds which have grown higher, and in which the excess weed killer is collected in a recovery receptacle and recycled back to the sprayer. While such systems are available and have been used satisfactorily, and have applied the weed killer primarily to the weeds without application to the cultivated crop, the equipment is quite expensive. Clogging of the recirculation system sometimes occurs and during unfavorable wind conditions much of the sprayed weed killer is deflected from the target plant and hits the crop surrounding same. One answer to this problem has been proposed by James A. McKirdy in U.S. Pat. No. 4,019,278 who provides a weed bar through which the herbicide is circulated and which permeates the weed bar so as to wipingly engage with the weeds that come into contact with it. The weed bar is pulled around behind the tractor, and the whole assembly is held at an elevation or height so that only the weeds are contacted and the shorter crops do not come into contact therewith. Still another proposal has been made by James H. Roberson in U.S. Pat. No. 4,187,638 in which elongated polyvinylchloride pipes, contain herbicide and have extending therethrough wick like materials fabricated preferably of nylon rope for engagement with the weeds. The herbicide moves by capillary action from the pipe containing the herbicide and again wipingly engages the wetted rope with the tall weeds extending above the desired plants. There have been certain difficulties encountered with such apparatus, such as breaking of the pipe through engagement with rocks or stumps, difficulties in maintaining the exposed wick portions sufficiently wet for application of the herbicide, and leakage around the apertures through which the nylon ropes are braided.

SUMMARY OF THE INVENTION

According to this invention, an endless nylon rope is constantly immersed in a shallow level of herbicide contained in an immersion basin and thereafter trained over and around two distally mounted sheaves, at opposite ends of an elongated boom. The boom is held at the proper elevation so that the wetted rope moving along on either side of the boom engages only the undesirable weeds. Loss of herbicide, through sloshing, is minimized or completely avoided by maintaining the herbicide in the immersion basin at a low level and maintaining a high basin wall. The positive application of herbicide to the weeds is insured by the constant immersion of the ropes into the herbicide through a series of drums journalled in the immersion basin and immersed partially into the herbicide contained therein. Therefore, every revolution of each drum immerses a portion of the rope into the herbicide which is then fed at a relatively low speed around the distally mounted sheaves and in the process wets the undesirable weeds in the paths defined by the rope on either side of the boom containing the distally mounted sheaves.

DESCRIPTION OF THE PREFERRED EMBODIMENT

Referring now to the specification, the device of this invention is designed for selectively applying herbicide through wiping engagement to vertically standing weeds. One of the most offensive weeds with which farmers have had to contend, is Johnson Grass. This weed grows to very tall, and involves a network of rhizome root connections underground which makes the weed practically impossible to control by standard methods. The rhizome networks involve a horizontally dispersed group of root like growths, which differ however from roots in being able to establish reserve deposits of nutriment, nodes and buds, and which are capable of establishing a separate and independent root system and a separate and independent sprouting system. Thus, even if the parent plant were dug completely up including the parent root system, the plant would not die because of the accessory root system and accessory sprouting systems provided by the horizontally disposed rhizome network in all directions. Because of this weed, many of the bottom land farms in the Mississippi and the Ohio Valley had been all but given up for lost due to Johnson Grass.

Recently, however, there has been introduced onto the market certain non-selective herbicides, such as one sold by Monsanto Chemical under the names ROUNDUP*, which if wiped onto a small area of the foliage will completely kill the plant including the root and rhizome systems. Unfortunately, the herbicide is non-selective and will also kill other plants. Nevertheless, because of the characteristics of Johnson Grass and most other noxious weeds, the weeds attain quick initial growth before the crop has achieved the same height. Thus, it is possible to apply the herbicide onto the noxious weeds through wiping engagement without touching the shorter crops.

*Registered trademark of Monsanto Chemical Co. for the isoproplyamine salt of glyphosate in which the active ingredient is N-phosphousmethyl glycine.

Another factor which adds to the desirability of selectivity is the cost of the herbicide itself. Under present conditions ROUNDUP sells for about $60 to $70 per gallon. Since ROUNDUP is mixed with water, at a ratio of about 1:3, the finished solution costs in excess of $15.00 per gallon. Therefore, it is incumbent upon the farmer to see both that the herbicide is not applied to the expensive crop, and that the herbicide itself is not wasted.

Figure 1:
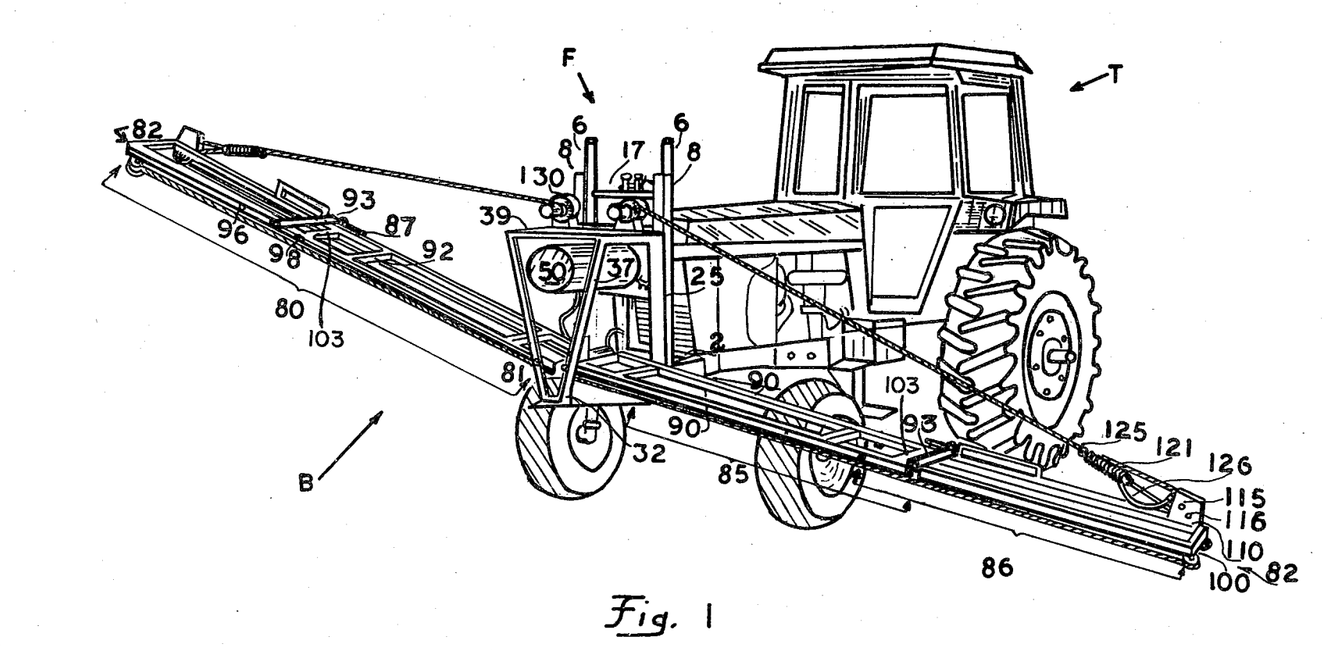
FIG. 1 is a view in perspective with parts not shown for purposes of illustration and which illustrates the boom of this invention mounted on the tractor withone section of said boom lowered and with one section of the boom raised.
Figure 4:
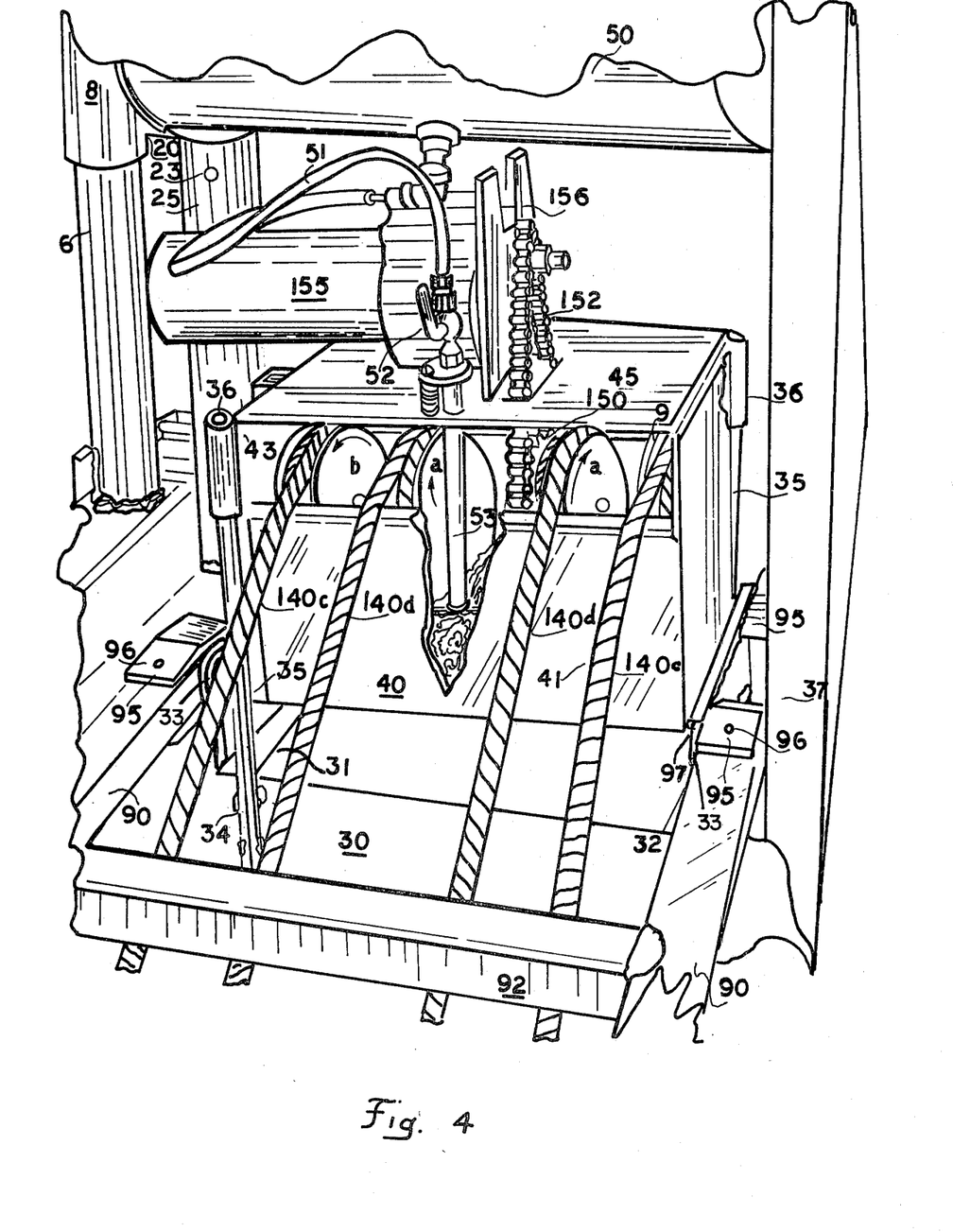
FIG. 4 is an enlarged fragmentary view, in perspective, illustrating the drive means for the drums and their relation to the immersion basin and the relationship of the reserve tank thereto.
Figures 7, 8:
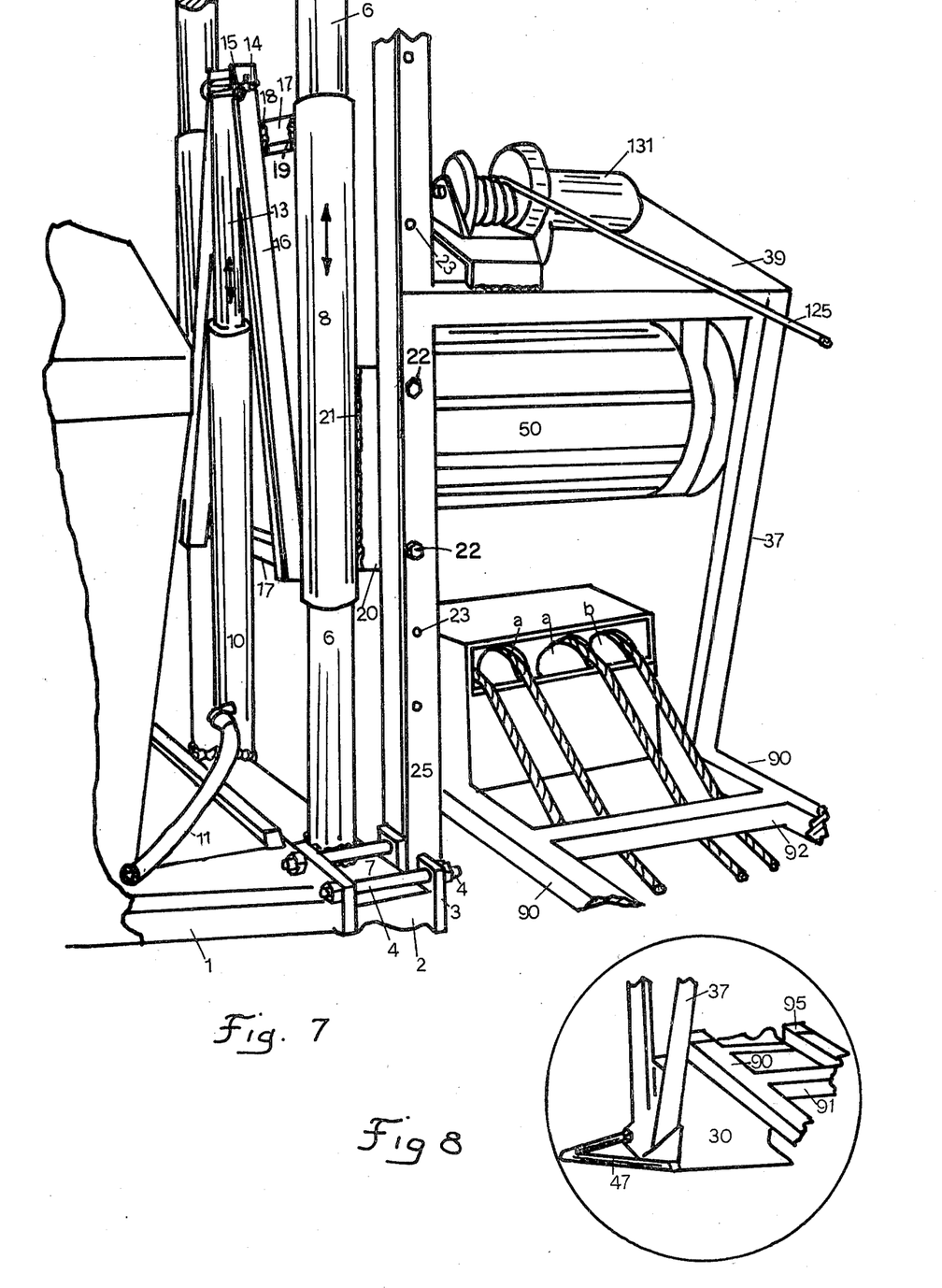
FIG. 7 is a fragmentary view, in perspective, from the rear illustrating the supporting frame work of this apparatus attached to the tractor and the height adjustment means of the supporting frame work and the relationship of this assembly to the laterally extending boom sections.
FIG. 8 is a view in perspective of the weed contacting apparatus of this invention which extends forwardly of the supporting frame work of the apparatus and bends weeds laterally into engagement with the wetted rope of the herbicide applicator.
Figure 9:
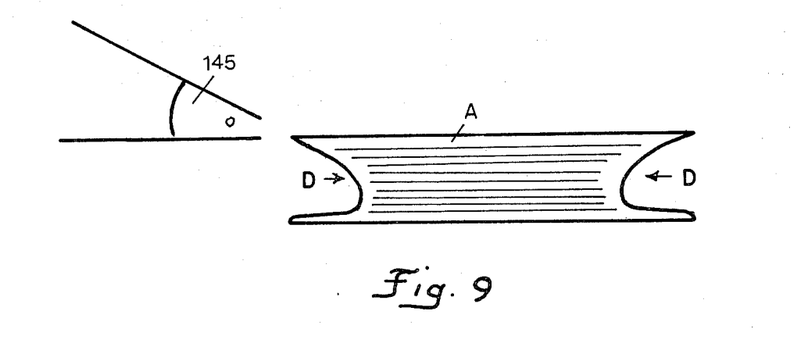
FIG. 9 is an elevational view of the specially designed drive drum of this invention.

Referring now to the drawings, the herbicide applicator consists basically of three parts. The applicator itself consists of a frame work F mounted upon a tractor T and includes a laterally extending boom B. Referring now to FIG. 1, FIG. 4 and FIG. 7, the frame work F is attached to the tractor T by means of side support members 1 bolted to the chassis of the tractor. The side support members 1 are attached to bottom cross support piece 2, as shown in FIG. 7 by attachment plates 3 and bolts 4. Attached to the bottom support member 2 is a vertical round stationary post 6 welded at point 7 to the cross piece 2. A sleeve 8 surrounds said stationary support and is moved by means of hydraulic cylinder 10 through the piston 13. The power to the hydraulic cylinder 10 is supplied through hydraulic line 11 from the tractor.

At the end of the piston, is a pin 14 which is connected by cotter key 15 to diagonally disposed struts 16 which are welded top and bottom to cross pieces 17, by means of welds 18 and 19. A flange 20 welded to the sliding sleeve 8, by means of weld 21, is attached to the angle iron 25. Angle iron 25 serves as a vertical support piece and attaches to flange 20 by means of bolts 22 through bolt holes 23. It will be noted that the angle iron 25 contains a series of unoccupied bolt holes 23. Thus it is possible by removing the bolts 22 to adjust the position of the entire assembly upwardly or downwardly in one or more different bolt holes 23 disposed along the vertical standard 25 and thus raise or lower the hole assembly. Additionally, the entire assembly can be raised by hydraulic cylinder 10 through flange 20 attached to vertical standard 25. As best can be seen in FIG. 4, the vertical support member has attached thereto two side steel plates 30 forming the side walls of a support frame, a steel beam 31 forming the back of said frame and a steel plate 32 forming the front cross piece of the frame. A mounting plate 33 is attached to the front cross piece 32 and rear cross piece 31, respectively, as a mounting means for the pivot pin 97 of the boom which will be described in more detail later. A support rod 35 is welded at point 34 to the side steel plate 30 and is equipped with a sleeve 36 which is for the support of the immersion basin 40. The immersion basin 40 consists basically of side wall 41, front wall 42 and real wall 43 and top cover 45.

The reserve tank 50, as is best seen in FIG. 1, 4 and 7, is connected via liquid conduit 51 to the inlet tube 53 leading to the immersion basin 40. The immersion basin 40 in FIGS. 4 and 7 is shown in the raised position for the application of the endless rope 140 to the drive drum a and the idler drums b. Normally, the immersion basin 40 will be located at a lower level to that the endless rope sections 140c and d would be below the cross piece 92 and would not rub against the lower portion thereof. A simple valve 52 is interconnected between the liquid conduit 51 and the inlet tube 53 which tube extends down into the immersion basin 40 and has a restricted orifice at point 54. A float valve 60 of special design is supported by a L shaped stationary support and has a vertical leg 55 welded at a point 57 to the bottom of the basin 40 and a short leg 56 supporting the inlet tube 53 of the liquid conduit 51. The float valve consists of a hinge in which the short leaf 61 is attached to the vertical leg 55 of the L shaped member by means of bolt 62 and a free swinging leaf 63 attached by hinge pin 64. The free swinging leaf 63 contains a resilient rubber pad 65 which acts as the valve member when it is in engagement with the restricted orifice 54 of the inlet tube 53. A cork 66 or other float located at the end of the free swinging leaf holds the pad in closed position. As the level 70 of the liquid herbicide recedes however, the leaf lowers thus allowing a flow of liquid into the immersion basin 40.

Because of the fact that the liquid immersion basin is on a tractor moving across a cultivated field, and is subjected to jolts and jars, the liquid level of the herbicide is purposely kept shallow. This is to prevent sloshing of the liquid out of the immersion basin 40. Additionally, the walls of the immersion basin are relatively tall to minimize or prevent any loss of the valuable liquid herbicide through sloshing or splashing. As previously has been mentioned, connected to the bottom front steel plate 32 are a pair of front diagonally disposed struts 37, corresponding to some extent to the vertical support post 25 in the rear. A top plate 39 is attached as by welding to the front diagonally disposed struts 37 and the rear support posts 25. A triangular projecting metal rod 47 attached to the base of the front disposed struts 37 forms a triangular projecting weed bender 47 for bending weeds in the exact center of the structure laterally into engagement with the herbicide applicator as will be more fully set forth later.

Referring now to the boom section B of the apparatus, the boom consists of two sections 80 each having a medial end 81 and a distal end 82. In a preferred embodiment each section of the beam consists of a medial portion 85 and a distal portion 86.

The medial portion 85 consists of tubular steel side supports 90 and tubular steel cross pieces 91 and 92. At the distal, end 81 of the medial portion 85 there is a break away clip 95 containing a vertical shear pin 96. The break away clip provides a pivot point for medial end 81 through the provision of pivot pin 97 for the boom B. At the distal end of the medial portion there is another pivot point, i.e. pin 98 wherein the distal portion of the boom 86 is pivotably attached to the medial portion 81. As can be seen more clearly in FIGS. 10 and 11, the medial portion 85 of the boom extends out past the pivot pin 98. The tubular stop member 93 thus acts as a stop for the medial end of the distal portion 86 of the boom when it is in extended position. However, as can be seen in FIGS. 1 and 11, when the distal portion 86 is in extended position with the medial portion 85, they can be locked into position by means of a conventional door slide bolt or other locking members 87 shown mounted axially on tubular side steel supports 90. It is of course possible to use other means of locking the two steel pieces together, however, the conventional door slide bolt 87 works very well without danger of damaging the tubular steel members.

As can been seen by reference to FIGS. 1 and 4, the distal portion 86 of the boom B consists of tubular side members 102 and tubular cross pieces 103. A tubular piece 100 at the end acts as a support for the distally mounted sheaves 107 as will be described later. However, the end piece 100 is attached to a smaller telescopic tubular side member 101 which slides into the tubular side member 102 and is held into position by means of set screw 109. This is for the purpose of adjusting the tension on the rope 140 forming the herbicide applicators. The sheaves 107 are attached through axle housing 106 and by weld 105.

Figure 5:
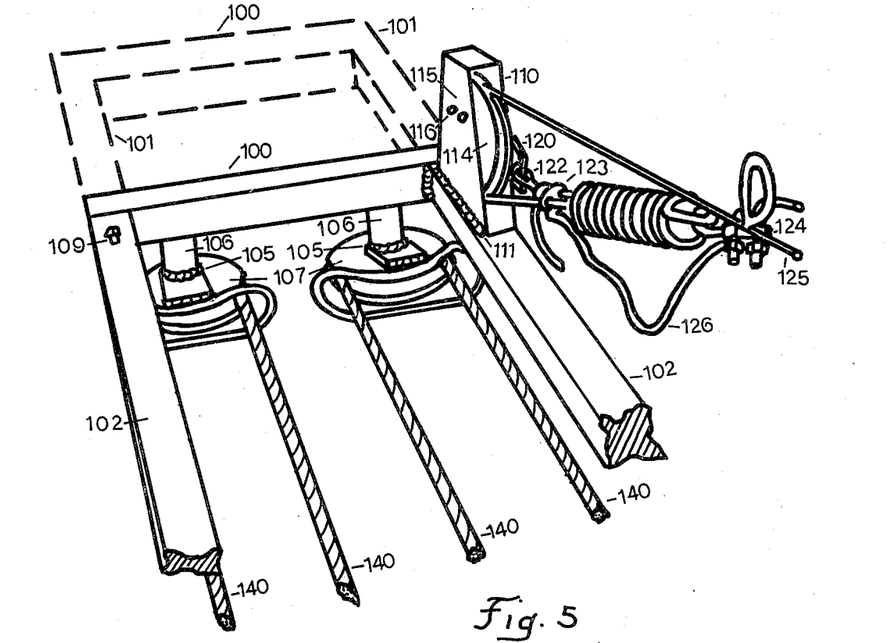
FIG. 5 is an enlarged fragmentary view in perspective of the wetted endless rope trained over the distally mounted sheaves at one end of the boom and the coil spring snubber attached to the end of the cable for absorbing vibrations and for supporting the end of the boom.
Figure 6:
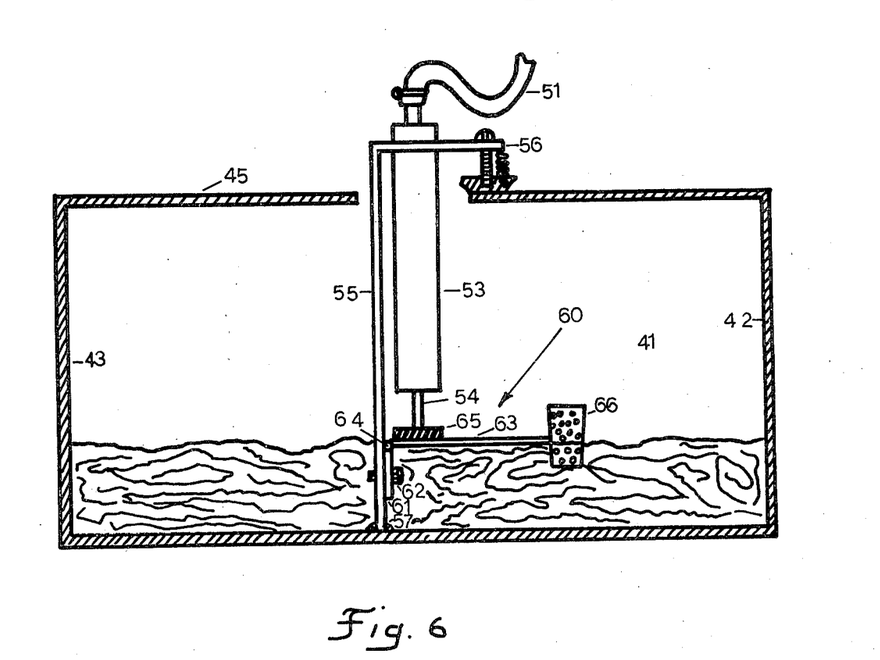
FIG. 6 is a sectional view of the immersion basin in which the drive drums have been removed for purposes of illustration and which illustrates the feed tube for the liquid herbicide, in combination with the float valve and the shallow liquid level of herbicide in said basin.

The boom is supported by means of a cable 125 looped around a dead sheave 114 set in dead sheave housing 110 which is welded to the tubular steel support member 102 by means of weld 111. The cable is attached at its free end to the end of spring 121 which in turn is connected back to the body of the cable 125. The coil spring 121 maintains the tension of the cable loop in the groove of the immovable sheave. Thus, when the device runs into a large hole, the boom will drop suddenly and will be pulled back into position by the spring, which will apply then sufficient tension onto the groove of sheave 110 through the cable loop to quickly dampen or snub the vibrations and bring the boom back into equilibrium without undue oscillation. Bolts 115 and 116 hold the sheave 110 in fixed or dead position. A flange 120 projects from dead block housing 110 and is attached by means of harness snap to an anchoring plate 123 which attaches both to the coil spring 121 and the end of the cable 125. The cable however, is again looped to form a safety loop 126 and joined to a split clevis 124 attached again to the supporting cable 125. This second connection acts as a safety support in the event that the coil spring breaks or otherwise comes loose so that the boom does not drop all the way to the ground.

The cable as is shown in FIGS. 1, 7, 10 and 11 are wound around cable drums 130 controlled by a pair of motors 131. Therefore, as is shown in FIG. 1 the boom can be raised vertically or it can be raised 45° or it can be lowered, as is shown in FIG. 1, almost to the ground. This allows for the tractor operator to raise the boom sections without completely disassembling same in order to go through gates or to lower portions to go beneath overhanging branches or the like.

Figure 10:
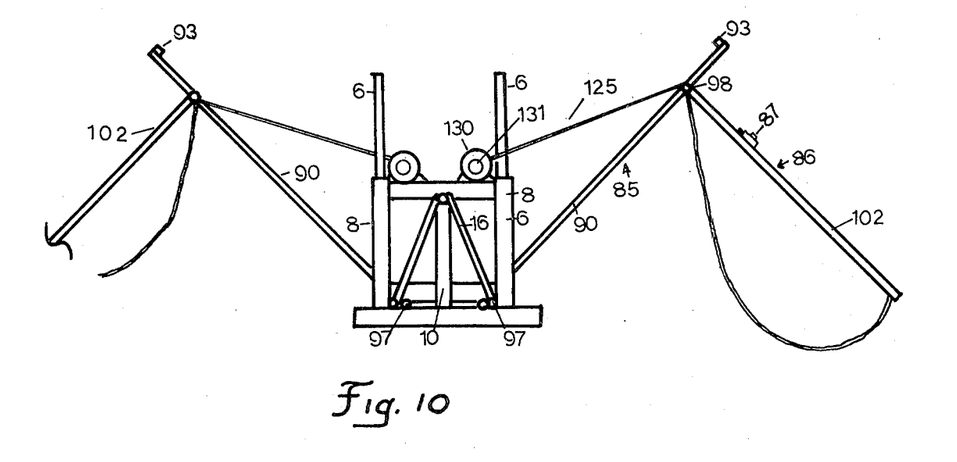
FIG. 10 is a diagrammatic view illustrating the boom of this invention in partially raised and folded position.
Figure 11:
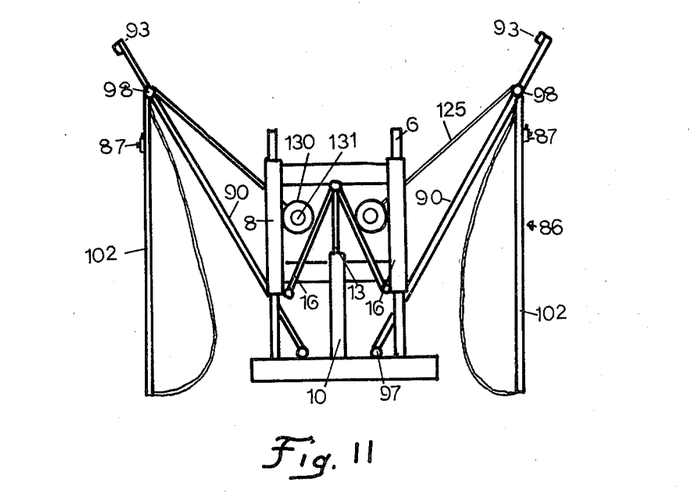
FIG. 11 is a diagrammatic view illustrating the boom of this invention is fully raised and folded position for travel through gates or on the highway.

However, in order to move the apparatus on the highways or through narrow gates, it is possible through removal of the pivot pins 98, to raise the medial section of the boom 85 and lower the distal portion of the boom 86 through the position shown in FIG. 10 to the finally folded up position shown in FIG. 11. Thus, the boom can be folded up for transportation through narrow gates or on highways or the like.

Figures 2, 3:
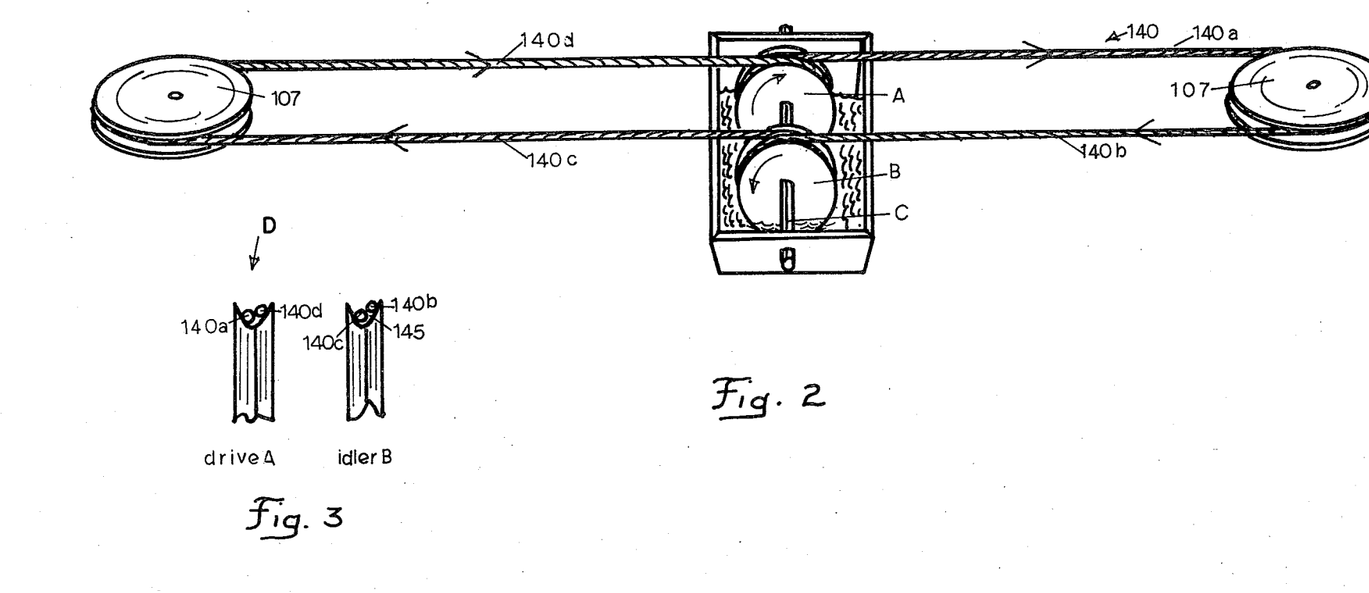
FIG. 2 is a partially diagrammatic illustration which illustrates the drive drum and the idler drum of this invention and the endless rope trained over the distally mounted sheaves and which illustrates further the endless rope wrapped around said drum and the disposition of the medially mounted drums being journalled so that the bottom portions thereof are immersed below the liquid level of the herbicide within the basin.
FIG. 3 is a partially diagrammatic and fragmentary view of the drive drum and the idler drum which illustrates a higher groove angle on one side of the wall of the rim groove of said drums.

The real heart of the apparatus however, lies in the endless rope 140, which is diagrammatically shown in FIG. 2 and FIG. 3. The rope is looped in one full revolution around the drive drum A and thence through the end of the distally mounted sheaves 107 and returns in the opposite direction to the idler drum B. It will be noted that the rope completely loops both of the drums so that driving the axle C of drum A the drive drum A will drive the rope 140a around sheave 107 and back in section 140b around the idler drum B out through 140c around 107 and back through 140d to the drive drum A. It will be noted that the direction of the revolution of drive drum A is the opposite of the direction of revolution of idler drum B. The tension is greatest on the incoming portion of the rope. Thus, as is shown in FIG. 3 it is necessary that the groove angle 145 of the groove D of drum A be higher on the incoming side than on the outgoing side. Thus as is shown diagrammatically in FIG. 3, the incoming portion of the rope 140d is on the high side of the groove angle while the outgoing portion of the rope 140a is on the lowest part of the groove D. Additionally, looking at idler drum B, the incoming portion 140b is on the high side of the groove angle 145 whereas the outgoing portion 140c is on the low side of the groove D.

It is of course possible to use a groove having a wide radius so that the groove angle on either side is rather high. Nevertheless, it is important that one of the groove angles be high so that the drive drum will drive the rope and the incoming drum will be driven by the rope at the proper speed.

The actual drive mechanism utilized is best shown in FIG. 4 and consists of a sprocket 150 over which chain 152 is trained and is connected to motor 155 supported on motor support 156. In this case, since a pair of endless ropes are utilized, the two drive drums A are driven by the same sprocket 150 (through a coupling not shown) and the two idler drums are driven by the rope in the direction indicated on the drawings.

The speed of the rope 140 should be in the range of 10 to 20 lineal feet per minute. The speed should not be so fast so that the rope acts as a pump to pump the liquid herbicide out of the immersion basin 40. On the other hand, the speed should be fast enough that the rope acting as the herbicide applicator is wet both on the incoming and the outgoing side. We have found that a preferable speed is about 15 lineal feet per minute.

We have also found that nylon braided rope works well in this application. There is some stretching, but this can be compensated for by use of the telescopic end piece 101 previously described in the application.

The constantly moving rope which changes direction passing around the distally mounted sheaves 107 forms an applicator moving in both directions to and from the medially disposed drums to the distally disposed sheaves and serves as a constant supply of liquid herbicide in wiping engagement with the vertically standing weeds.

As previously mentioned, the weeds have a normal quick initial growth so that they are taller than the desirable crops and therefore the boom can be disposed at a level so as to engage the weeds and not the plants. The triangular weed bender 47 in the front of the apparatus tends to bend the weeds laterally into engagement with the wetted rope 140 and the coil spring snubber 121 bends to adequately protect the extended boom B from undue vibration during movement across the fields.

The boom can be adjusted to a proper height so that the weed killer can be wipingly engaged with the weeds through the wetted rope without engagement of the herbicide with the desirable plants. The boom can be adjusted by means of the hydraulic cylinder 10 and the piston 13 to various levels within the field or the entire assembly can be raised or lowered on the vertical standard 25 by engagement of the bolts 22 through another set of bolt holes 23.

Many modifications will occur to those persons skilled in the art from the detailed description hereinabove given which is meant to be exemplary in nature and non-limiting except so as to be commensurate in scope with the appended claims.

We claim:

1. An elongated boom and a frame, said elongated boom having a proximal end and a distal end and which is pivotably connected at its proximal end in cantilever fashion to said frame for vertical movement of said boom through an arc from a horizontal position to a vertical position, the improvement of an energy absorbing vibration damper comprising in combination:
   A. a non-rotatable sheave mounted at the distal end of the boom;
   B. a cable operatively connected at the proximal end to said frame and looped around said non-rotatable sheave at the distal end of said boom; and
   C. a coil spring attached at one end to the free end of said looped cable and at the other end to the body of the cable.

* * * * *